United States Patent [19]

Asahara et al.

[11] 4,042,526
[45] Aug. 16, 1977

[54] NON-CRYSTALLINE SUBSTANCE HAVING AN OPTICAL MEMORY EFFECT

[75] Inventors: Yoshiyuki Asahara, Kawasaki; Tetsuro Izumitani, Hino, both of Japan

[73] Assignee: Hoya Glass Works, Ltd., Tokyo, Japan

[21] Appl. No.: 566,577

[22] Filed: Apr. 8, 1975

Related U.S. Application Data

[63] Continuation of Ser. No. 362,123, May 21, 1973, abandoned.

[30] Foreign Application Priority Data

May 23, 1972  Japan .................................. 47-50906

[51] Int. Cl.$^2$ ................................................ G11B 7/00
[52] U.S. Cl. .................................... 252/300; 252/501; 340/173 CC; 350/160 P
[58] Field of Search ................. 252/300, 501; 350/3.5, 350/160 P; 96/27 H; 340/173 CC

[56] References Cited

U.S. PATENT DOCUMENTS 3,720,921  3/1973  Schools et al. ................ 340/173 CC

OTHER PUBLICATIONS

Renault, S., "Electrical . . . System" Vesres Refract 1 1972 (2663) pp. 88-93 as abstracted in Chem. Abs. vol. 78, No. 63751b.
Asahara et al. "Switching . . . Glasses" Japan J. Appl. Phys. 11 (1972) pp. 109-110.
Kolomiets et al. "Effect . . . Selenide" J. Non-Cryst. Solids 1971, 5(5) pp. 389-401 as abstracted in Chem. Abs. 74:92392h.

Primary Examiner—Benjamin R. Padgett
Assistant Examiner—Deborah L. Kyle
Attorney, Agent, or Firm—Sughrue, Rothwell, Mion, Zinn and Macpeak

[57] ABSTRACT

A non-crystalline substance for use in an optical memory device which consists of an As-Se system non-crystalline material and the additional third component(s) Zn, Au, or Ag and/or Cu. The substance is characterized by its transmission ability in the visible region as well as in the I.R. region and its extreme reduction of transmittance upon irradiation with, e.g., a laser beam.

13 Claims, 1 Drawing Figure

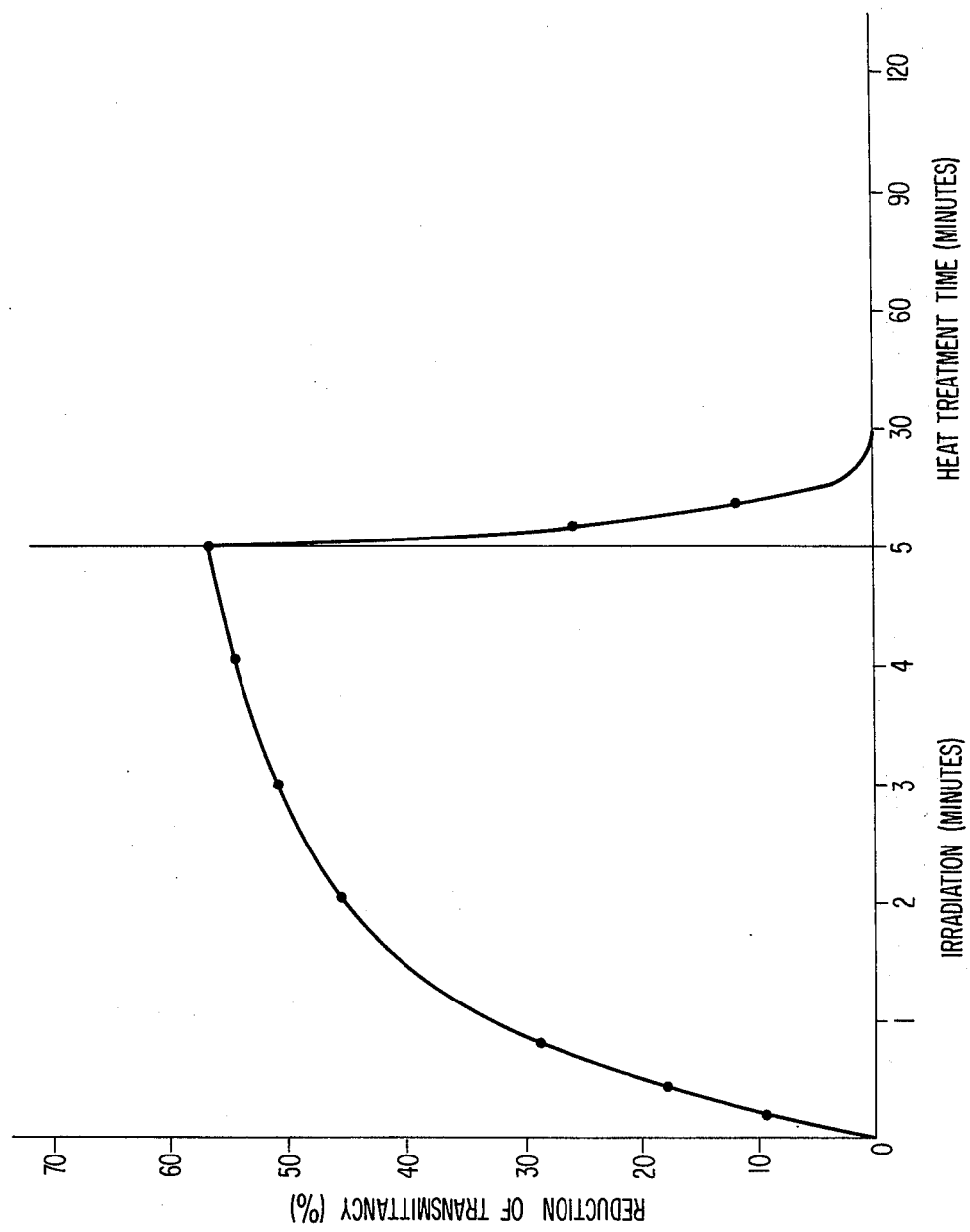

NON-CRYSTALLINE SUBSTANCE HAVING AN OPTICAL MEMORY EFFECT

This is a continuation of application Ser. No. 362,123, filed May 21, 1973, now abandoned.

BACKGROUND OF THE INVENTION

1. Field of the Invention

This invention relates to a non-crystalline substance having an optical memory effect which consists of As and Se as the main ingredients, and the additional third component(s), Zn, Au or Ag and/or Cu.

2. Description of the Prior Art

Conventional optical memory substances include non-crystalline chalcogenides such as Ge—As—Te, Ge—S—Sb—Te, As—S—I, etc. It is well known that the optical properties of these substances such as the transmittance, refractive index, reflectivity, etc., vary upon irradiation with a laser beam and thus these substances are suitable for use in optical memory devices. These conventional substances are characterized by their high memory density, i.e., more than $10^7$ bit/cm$^2$, and high reading efficiency. They do not require any processing operations including development, fixing, etc. Further, they have reversibility and thus memory erasing and writing may freely be effected in these substances, a substantial merit thereof.

However, in the Ge—As—Te system, the transmission range falls only in the infra-red region, and thus there exist some defects in operation (limitation on the type of irradiation which can be used, i.e., only infrared irradiation) and detection (the method of detecting infrared radiation must be considered during reading the optical memory device). Further, a high power laser beam is required during use.

With respect to the As—S—I system, the weather resistance thereof is poor and thus the surface of the substance is apt to be deteriorated with the passage of time.

On the other hand, in the Ge—As—Te system the yield point is high, i.e., Tg (transmittance) is high. Accordingly, if the transmittance is to be changed depending upon the light used, a high power laser beam is required. This is not preferred from an economical point of view and, further, the use thereof is limited, i.e., high power laser apparatus is mandatory.

SUMMARY OF THE INVENTION

The present invention is based upon the discovery that with the addition of third component(s) consisting of Zn, Au, Ag and/or Cu to the As—Se system non-crystalline material, hitherto well known to have high transmission ability a part of the visible region in addition to the infra-red region, the transmittance of the resulting substance is reduced upon irradiation with a laser beam or other high intensity source and thus the same is very suitable for optical memory applications.

The present substance is characterized by the following aspects: The change in the transmittance may be detected in the visible light region due to the use of the As—Se series component which transmits visible rays, and such can be easily detected due to the high transmission reduction. Such characteristic merits have never been attained in the conventional substances as described above which contain Ge. Moreover, it is not required that the laser power be high, which also is advantageous.

With respect to memory erasure, the present substance further has the characteristics that writing and erasing of the memory can freely be effected, in that the original transmittancy may easily be recovered by heat treating the substance at a temperature of 170°–200° C.

Thus, the present invention provides a non-crystalline substance having a good optical memory effect which consists of 25–65 atomic % As and 25–65 atomic % Se and additionally one or more of 0.1–10 atomic % Zn or 0.1–8 atomic % Au or 0.1–35 atomic % Ag and/or Cu, totalling 100 atomic % in all.

BRIEF EXPLANATION OF THE DRAWING

The graph attached hereto illustrates one embodiment of the use of the present optical memory substance, showing the relationship between change in transmittance and laser irradiation time as well as the heat treatment time.

DESCRIPTION OF THE PREFERRED EMBODIMENTS

In the following Table, some embodiments of the present optical memory substances are specifically illustrated. The reduction of the transmittancy shown therein is for a thin film (2–3 μ) of a substance of the present invention which is prepared by direct vacuum evaporation and is irradiated by a 16 mW laser beam. (He-Ne gas laser; 6328A) White light from a tungsten lamp was used to measure the transmission. Nos. 12 and 13 in the Table are conventional materials. It can be seen from the data in the Table that No. 5 (according to the present invention) which contains As and Se in the same ratio as in the two reference materials has a greater reduction in transmittancy than the two reference materials.

The direct vacuum evaporation was conducted using standard art techniques, that is, glass pieces were charged in a high vacuum silica crucible (7 mm diameter, 5 mm height) and the pressure reduced to $10^{-3}$ mm Hg by a rotary pump. The glass pieces were electrically melted using a tungsten filament and then evaporated. The vapors condensed and deposited on the surface of the substrate as a thin film.

The glass was prepared by charging the raw materials into a silica ampoule (7 mm diameter, 3–5 cm length), sealed under vacuum and heated for 3 hours at 800°–900° C. The resulting material was cooled in air, the ampoule broken and then the glass pieces charged to the high vaccum silica crucible.

Comparable results are obtained with using a mercury lamp (100 W) or a tungsten light instead of the He—Ne gas laser.

| Ex. | Ingredients (atomic %) | | | | | | | Transmittancy before irradiation | Reduction of transmittancy (%) Reduction of transmittancy after irradiation |
|---|---|---|---|---|---|---|---|---|---|
| | As | Se | Ag | Cu | Zn | Au | Ge | | |
| 1 | 28.0 | 42.0 | 30.0 | | | | | | 29.5 |
| 2 | 45.0 | 45.0 | 10.0 | | | | | | 30.9 |
| 3 | 60.0 | 35.0 | 5.0 | | | | | | 32.0 |
| 4 | 38.0 | 57.0 | | 5.0 | | | | | 35.0 |
| 5 | 32.0 | 48.0 | | 20.0 | | | | | 40.7 |
| 6 | 40.0 | 50.0 | | 10.0 | | | | | 33.1 |
| 7 | 45.0 | 45.0 | | 10.0 | | | | | 51.0 |
| 8 | 55.0 | 35.0 | | 10.0 | | | | | 61.2 |
| 9 | 50.0 | 45.0 | | 5.0 | | | | | 43.0 |
| 10 | 38.1 | 57.1 | | | 4.8 | | | | 28.0 |
| 11 | 41.7 | 41.7 | | 9.3 | | 7.3 | | | 29.4 |

-continued

| | Ingredients (atomic %) | | | | | | | Reduction of transmittancy (%) |
|---|---|---|---|---|---|---|---|---|
| | | | | | | | | Reduction of transmittancy after irradiation |
| Ex. | As | Se | Ag | Cu | Zn | Au | Ge | Transmittancy before irradiation |
| 12 | 40.0 | 60.0 | | | | | | 27.7 |
| 13 | 36.3 | 54.5 | | | | | 9.2 | 0.0 |

The graph attached hereto shows the relationship between the reduction of transmittance upon laser beam irradiation and the irradiation time as well as the relationship between the recovery of transmittance and the heat treatment time (at 190° C), wherein the substance of Example No. 7 given in the above Table was used.

In the substances of the present invention, the greater the content of As, the greater the reduction of transmittance upon laser beam irradiation. A content of more than 65% As, however, will be injurious to the necessary non-crystalline structure in the resulting substance, while an As content of less than 25% will decrease the reduction of transmittancy.

The Se and As have a mutual relationship; that is, the greater the content of Se, the lesser the reduction of transmittancy. Further, with a content of more than 65% Se, the resulting substance cannot be practically used, and at an Se content of less than 25%, the resulting substance cannot retain its non-crystalline structure.

With respect to the third component(s) which is (are) the characteristic feature of the present substance, at a content of more than 10% Zn, more than 8% of Au, or more than 35% of Ag + Cu, (0-32 atomic % of Ag and 0-25 atomic % of Cu) respectively, the resulting substance cannot retain its non-crystalline structure, and thus, the substance will lose its optical memory effect. On the other hand, at a content of less than 0.1% of the third components, the desired effect cannot be attained. Ag + Cu is more effective than the other additives to attain the object of this invention.

More preferred results are obtained if the minimum atomic percentage of Zn or Au or Ag and/or Cu is 1.0%. Most preferred results are obtained when 5-20 atomic percent Ag and/or Cu are used, if Ag and Cu are the additive components present.

While the invention has been described in detail and with reference to specific embodiments thereof, it will be apparent to one skilled in the art that various changes and modifications can be made therein without departing from the spirit and scope thereof.

What is claimed is:

1. A method of storing information in an optically sensitive non-crystalline substance which comprises:
   a. irradiating the non-crystalline substance with a high intensity light source to change its transmittance from one value to a second value, said non-crystalline substance comprising 25-65 atomic % of As, 25-65 atomic % of Se and additionally at least one of 0.1-10 atomic % of Zn, 0.1-8 atomic % of Au, and 0-32 atomic % of Ag and 0-25 atomic % of Cu, the total amount of Cu + Ag being 0.1-35 atomic %; the total being 100 atomic % in all;
   b. discontinuing the irradiation of Step (a) so that said non-crystalline substance can retain said second value of transmittance and thereby act as a memory device for storing information, and
   c. heating said non-crystalline substance to a temperature of 170°-200° C. to cause said second value of transmittance to return to said first value and thereby erase said stored information.

2. The method of claim 1, wherein said additional component is employed in an amount of at least 1.0 atomic % of said non-crystalline substance.

3. The method of claim 2, wherein said additional component is 0.1-10 atomic % of Zn.

4. The method of claim 2, wherein said additional component is 0.1-8 atomic % of Au.

5. The method of claim 4, wherein said additional component is 1.0-8 atomic % of Au.

6. The method of claim 2, wherein said additional component is 0.1-32 atomic % of Ag.

7. The method of claim 2, wherein said additional component is 1.0-32 atomic % of Ag.

8. The method of claim 2, wherein said additional component is 0.1-35 atomic % Ag + Cu, both elements being present.

9. The method of claim 2, wherein said additional component is 1.0-35 atomic % of Ag + Cu, both elements being present.

10. The method of claim 2, wherein said additional component is more than one of Zn, Au and a mixture of Ag plus Cu.

11. The method of claim 1, wherein said additional component is present in an amount of at least 1.0 atomic % of Cu + Ag.

12. The method of claim 1, wherein said additional component is present in an amount of at least 5-20 atomic % of Cu + Ag.

13. The method of claim 1 wherein said high intensity light source is a laser.

* * * * *